July 21, 1970  J. J. DAVIN  3,521,234
MOTOR VEHICLE MIRROR TAILGATING OBSERVATION AND WARNING SYSTEM
Filed Jan. 13, 1969  2 Sheets-Sheet 1
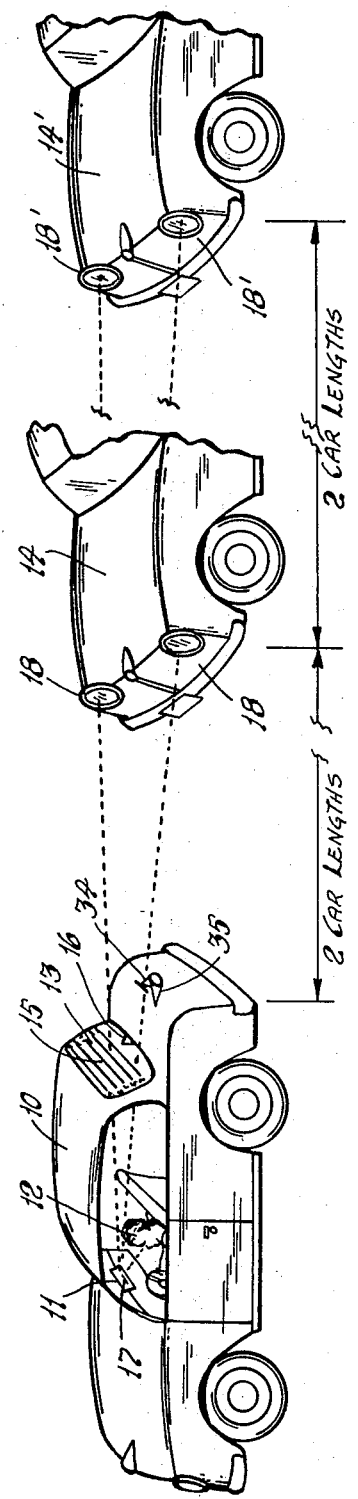
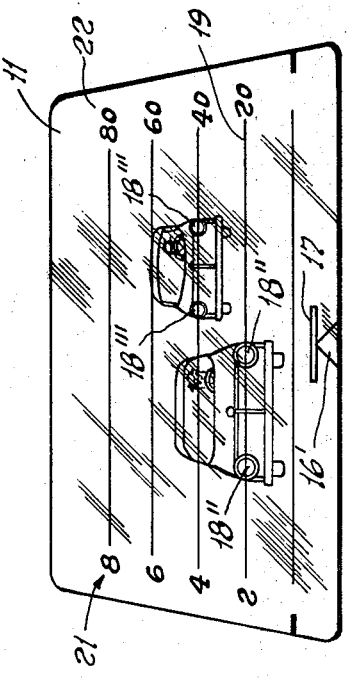
INVENTOR.
JOHN JOSEPH DAVIN July 21, 1970     J. J. DAVIN     3,521,234
MOTOR VEHICLE MIRROR TAILGATING OBSERVATION AND WARNING SYSTEM
Filed Jan. 13, 1969     2 Sheets-Sheet 2
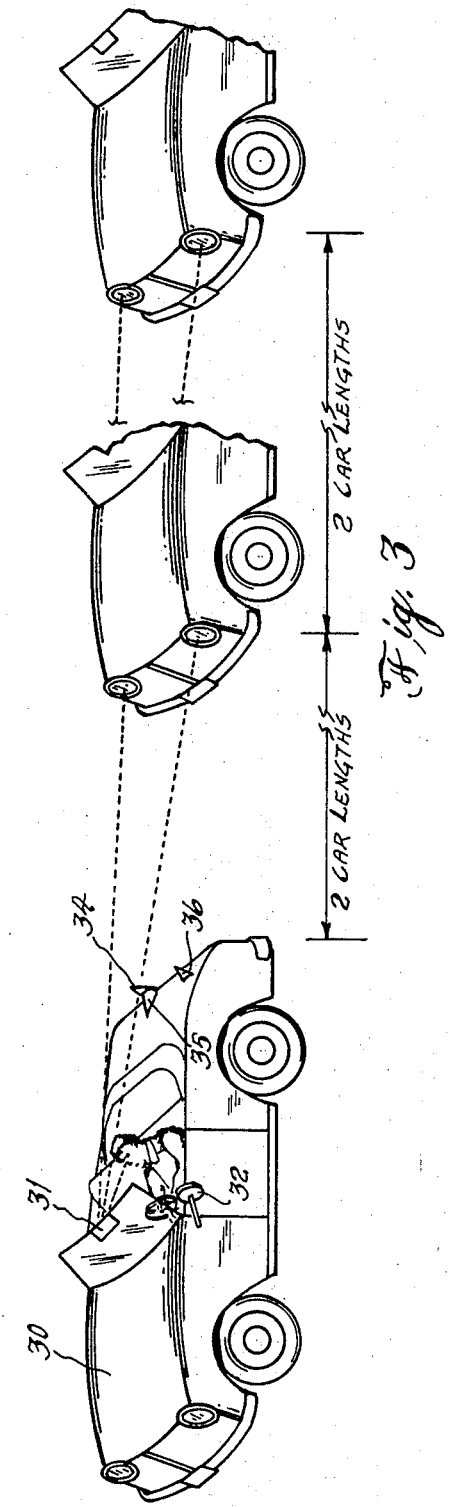
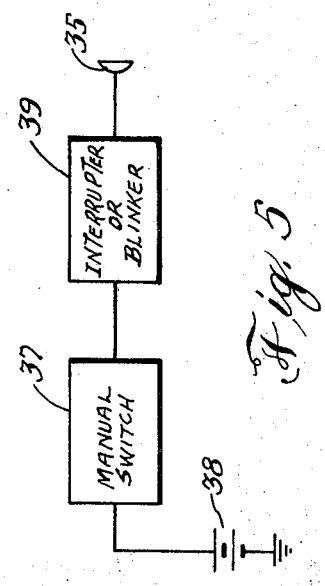
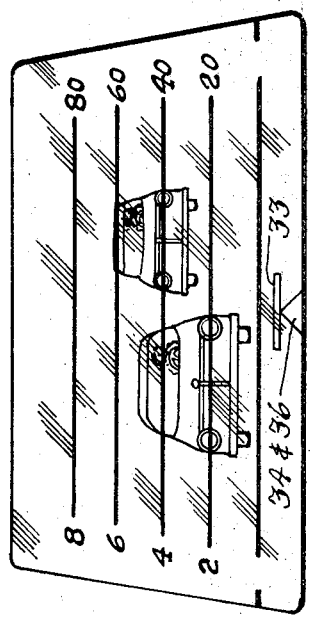
INVENTOR.
JOHN JOSEPH DAVIN United States Patent Office 3,521,234
Patented July 21, 1970

3,521,234
MOTOR VEHICLE MIRROR TAILGATING
OBSERVATION AND WARNING SYSTEM
John Joseph Davin, R.D. 2, Box 214, Troy, N.Y. 12184
Continuation-in-part of application Ser. No. 670,474,
Sept. 25, 1967. This application Jan. 13, 1969, Ser.
No. 790,586
Int. Cl. B60q 1/46
U.S. Cl. 340—104
10 Claims

ABSTRACT OF THE DISCLOSURE

A device by which an operator of a motor vehicle can ascertain the distance between his vehicle and a second vehicle therebehind. A rear view mirror having thereon a plurality of horizontally spaced lines and a reference mark is carried by said vehicle. The operator after calibration, aligns the reference mark on said mirror with another reference guide carried by said vehicle and dependent on the relative horizontal position of the image of said another vehicle can ascertain the separation in either distance or car lengths between the vehicles. Additionally, a warning or indicating system is employed to alert the driver of the second vehicle that he is too close. Such a system in its simplest form includes a switch connected to cause illumination of a rearwardly directed light.

CROSS-REFERENCE TO RELATED APPLICATIONS

This application is a continuation-in-part of application Ser. No. 670,474 filed Sept. 25, 1967, now abandoned for Motor Vehicle Rear View Mirror and Tailgating Warning System.

BACKGROUND OF THE INVENTION

Field of the invention

The present invention relates to rear view mirrors for motor vehicles and more particularly pertains to ascertaining the proximate distance of succeeding vehicle from a first vehicle and for warning said rear vehicle that the separation therebetween is unsafe for the speed at which said vehicles are travelling.

Description of the prior art

In the field of motor vehicle warning systems and vehicle separation determining means it has been the generally practiced custom to employ electronic devices to perform these functions. Such devices have been unsatisfactory in that they are expensive, complex, and in general single sensing means which only operate under one set of conditions. As for example, when the second or succeeding vehicle is within a fixed distance therefrom. Additionally, no means are provided to inform the operator of other unsafe separations since the systems are responsive to only fixed indicia or parameters. Primarily, such devices are operative and dependent on the light intensity of the headlights of the succeeding vehicle. That system is based on the fact that the light intensity is a function of distance under all conditions. This is not the case since the condition of the headlamps, lens, roadway, etc. are direct factors as well as the cleanliness of the rear window and the headlights. Additionally, such a system is effective only at night although most driving occurs during daylight hours. In view of the complexity, unreliability and restricted use of presently available devices they have been employed only in a limited sense.

SUMMARY OF THE INVENTION

The general purpose of this invention is to provide an observation, distance determining and warning system for motor vehicles that has all the advantages of similarly employed prior art devices and has none of the above described disadvantages. To attain this, the present invention provides on a rearwardly directed mirror or reflector of a motor vehicle a plurality of spaced apart horizontal lines. Such lines may be placed thereon directly or may be seen thereon by the light striking the same. The mirror carries a reference guide which when aligned with another guide carried by the vehicle provides a calibrated device by which the operator can ascertain the separation of a succeeding vehicle by observing the position of a portion of said rear vehicle on said mirror with respect to said indicia lines. There is also provided a rearwardly directed lighting system for warning the operator of said succeeding vehicle of his unsafe separation or tailgating.

In view of the foregoing it is an object of this invention to provide a simple, inexpensive, reliable and a safe device for determination of the separation of a first vehicle from a succeeding vehicle.

Another object is to provide a device for ascertaining whether a succeeding vehicle is separated therefrom by a safe distance for the speed of travel and for warning the operator of said succeeding vehicle of the fact that he is tailgating.

Other objects and many of the attendant advantages of this invention will be readily appreciated as the same becomes better understood by reference to the following detailed description when considered in connection with the accompanying drawings, in which like reference numerals designate like parts throughout the figures thereof.

BRIEF DESCRIPTION OF THE DRAWINGS

FIG. 1 is a perspective view of an embodiment made in accordance with the principle of this invention and illustrates the relative positions of several vehicles;

FIG. 2 illustrates the rear view mirror of FIG. 1 and the respective images seen thereon by the operator and the indicia markings.

FIG. 3 is a perspective view of another embodiment made in accordance with the principle of this invention as applied to another form of motor vehicle;

FIG. 4 shows the mirror of FIG. 3 and the images viewed thereon; and,

FIG. 5 illustrates in block form the electrical warning system associated with the devices illustrated in the prior figures.

DESCRIPTION OF THE PREFERRED EMBODIMENTS

In the illustrated embodiment of FIG. 1 a first motor vehicle 10 which, as shown is a sedan, is provided as is normal with a rear view mirror or reflector 11 that permits the operator 12 to view rearwardly of his vehicle through the back or rear window 13. The operator 12 by directing his vision toward the mirror 11 can view the two vehicles 14 and 14' succeeding him either singly or simultaneously. In most cases, however, the operator is primarily interested in only the vehicle directly succeeding him. Therefore it is assumed that vehicles 14 and 14' are the same vehicle at two different distances.

The rear window 13 of vehicle 10 is provided with a plurality of opaque horizontal lines 15 which may be etched onto the glass or placed thereon in a number of available means. Alternately, a series of wires or other indicia on a separate frame may be affixed to the window to facilitate installation and removal thereof. Included thereon is a reference guide indicia 16 for alignment of the movable rear view mirror 11 which has thereon a corresponding indicia 17 disposed at the lower portion of the mirror. This guide 16 may also take the form of a structure on the vehicle itself, as for example, a protrusion 34 on the rear light. These guides can take many well known forms and merely for illustrative purposes, an arrow and a single line have been shown. Light, either natural during the day or that emitted by the headlamps 18 of the succeeding vehicle, forms the image of these lines on the mirror 11.

The entire structure is initially calibrated and aligned by placing a second vehicle a selectable number of car lengths therebehind. For example, two car lengths, and the line image 19 thereof aligned with some structural element of the second vehicle such as the headlights 18 by manually moving the mirror 11 while the operator is normally seated in his driving position. When this is completed the mirror guide 17 is set to align with the guide 16. This may be accomplished by having the guide 17 releasably attachable to the mirror as by adhesive such as employed on masking tape or even magnetically since the rear plate of mirror is of a ferromagnetic material. This is necessary in view of the fact that not all drivers assume identical visual positions while driving. The succeeding lines are properly placed by repeatng the procedure with the second vehicle at various other car lengths therebehind. A distance of 4 car lengths is also shown in both FIGS. 1 and 2. FIG. 2 shows the mirror 11 and the images formed thereon. There are also optionally provided distance and speed markings for each of the lines 15. On the left of these lines at 21 are car lengths and at the right at 22 the relative approved safe speeds of these separation distances. In other words, at, say, a speed of 40 miles per hour the succeeding vehicle should be at least 4 car lengths behind. The operator during use merely sights in his mirror, determines the vehicle separation or relative speed then observes his own speed and mental comparison permits him to ascertain whether the following vehicle is too close for their speed and therefore creating an unsafe traffic condition generally referred to as "tailgating."

It must be understood that not all forms of motor vehicles are structurally identical and certain alterations are necessary in applying the principles of this invention thereto. Two obvious examples are convertibles and various trucks. The convertibles with their tops down do not permit the use of the rear window while most trucks do not have inside mirrors. Passenger automobiles also employ sideview mirrors. In the embodiment of FIG. 3 as applied to a convertible vehicle 30 there are shown both a rear view mirror 31 and a side mirror 32. Each has been provided with a series of horizontal lines identical to those described hereintobefore and applied in a similar manner. The mirror of FIG. 4 represents either that of 31 or 32 since they view in a similar fashion and are both adjustable. Each mirror is again also provided with an adjustable guide line 33 except that the corresponding guide 34 for the rear view mirror is positioned approximately centrally of the rear as above rear light 35 while the guide 36 for the side mirror is disposed closer to the same or drivers side at the rear. Clearly this embodiment of the invention permits its use on various other vehicles as well as being applicable to the sedan of FIG. 1.

Up this point only the operator of the first vehicle has been aware of a possible dangerous condition over which he lacks control. To alleviate this state of affairs the vehicles 10 and 30 equipped with the mirror arrangement are also provided with the warning system illustrated by way of FIG. 5. Carried on the dashboard or at any other convenient place easily accessible to the operator is a manual switch 37 which may be a simple single pole-single throw switch having one contact connected to the vehicle battery 38 whose other terminal is grounded. The other switch contact is connected to a standard commercially available interrupter or blinker 39 which in turn is connected to the filaments of one or more bulbs in one or more rear light 35 (also shown in FIGS. 1 and 3). This electrical system permits the operator to warn the driver of the succeeding vehicle of his unsafe proximity. Otherwise, he would be limited to the use of hand signals.

It should be understood, of course, that the foregoing disclosure relates to only preferred embodiments of the invention and that numerous modifications or alterations may be made therein without departing from the spirit and the scope of the invention as set forth in the appended claims.

I claim:

1. In a motor vehicle, an apparatus for ascertaining the separation distance of a succeeding vehicle therebehind which comprises:
   reflective means, supported on said motor vehicle, directed so as to permit the operator to view rearwardly thereof,
   said reflective means having thereon a plurality of spaced apart horizontal lines,
   a first reference guide carried by said reflective means,
   a second reference alignment guide carried by said vehicle rearward and in line with said reflective means for viewing by said operator,
   whereby when said reference guides are aligned said operator can ascertain the separation between his vehicle and said succeeding vehicle by observing between which of said lines a structural portion of said succeeding vehicle appears on said reflective means and if the separation is unsafe may physically signal to indicate such unsafe condition.

2. The apparatus according to claim 1 wherein said reflective means is an adjustable rear view mirror.

3. The apparatus according to claim 2 wherein said first reference guide is adjustable on said reflective means.

4. The apparatus according to claim 3 wherein the rear window of said vehicle is provided with a plurality of opaque horizontal lines and said second reference alignment guide.

5. The apparatus according to claim 4 further including indicia associated with each of said horizontal lines indicative of speed and vehicle separation.

6. The apparatus according to claim 5 further including signalling means comprising:
   a source of electrical energy
   a manually operable switch having one contact connected to said source,
   electrical interrupter/blinker means
   rearwardly directed lighting means
   electrical means connecting the other contact of said switch to said interrupter means and said interrupter means to said lighting means,
   whereby when said operator observes an unsafe separation he may operate said switch and thereby warn said driver of said succeeding vehicle.

7. The apparatus according to claim 2 wherein said plurality of lines are imaged on said mirror by and through the rear vehicle window which carries thereon:
   a removable frame having thereon a series of opaque horizontal spaced apart lines.

8. The apparatus according to claim 7 wherein said frame also carries said second reference alignment guide.

9. The apparatus according to claim 4 further including indicia associated with each of said horizontal lines indicative of speed and vehicle separation.

10. The apparatus according to claim 9 further including signalling means comprising:
- a source of electrical energy
- a manually operable switch having one contact connected to said source
- electrical interrupter/blinker means
- rearwardly directed lighting means
- electrical means connecting the other contact of said switch to said interrupter means and said interrupter means to said lighting means,
- whereby when said operator observes an unsafe separation he may operate said switch and thereby warn said driver of said succeeding vehicle.

References Cited
UNITED STATES PATENTS 3,469,234   9/1969   Greacen _____ 340—103 X HAROLD I. PITTS, Primary Examiner U.S. Cl. X.R.

340—103, 378, 97, 98, 100, 102, 74, 81